United States Patent
Gowda et al.

(10) Patent No.: US 10,320,549 B2
(45) Date of Patent: Jun. 11, 2019

(54) METHODS AND APPARATUS FOR SENDING FAST NEGATIVE ACKNOWLEDGEMENTS (NACKS)

(71) Applicant: QUALCOMM Incorporated, San Diego, CA (US)

(72) Inventors: Mohan Krishna Gowda, San Diego, CA (US); Gang Andy Xiao, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 623 days.

(21) Appl. No.: 14/681,637

(22) Filed: Apr. 8, 2015

(65) Prior Publication Data

US 2015/0295692 A1    Oct. 15, 2015

(51) Int. Cl.
*H04L 5/00* (2006.01)
*H04W 72/04* (2009.01)
(Continued)

(52) U.S. Cl.
CPC .......... *H04L 5/0055* (2013.01); *H04L 1/1841* (2013.01); *H04L 1/1848* (2013.01);
(Continued)

(58) Field of Classification Search
CPC ........... B63H 19/00; H04L 5/00; H04L 12/28; H04L 47/10; H04L 1/1887; H04L 1/1812;
(Continued)

(56) References Cited

U.S. PATENT DOCUMENTS

| | | | |
|---|---|---|---|
| 7,792,026 B2 | 9/2010 | Wang et al. | |
| 2005/0147110 A1* | 7/2005 | Connor | H04L 47/10 370/412 |

(Continued)

FOREIGN PATENT DOCUMENTS

| | | |
|---|---|---|
| CN | 101483507 A | 7/2009 |
| CN | 101552658 A | 10/2009 |

(Continued)

OTHER PUBLICATIONS

International Search Report and Written Opinion—PCT/US2015/025086—ISAEPO—Jul. 3, 2015.

(Continued)

*Primary Examiner* — Raj Jain
(74) *Attorney, Agent, or Firm* — Patterson & Sheridan, LLP

(57) ABSTRACT

Methods and apparatus are provided for quick recovery of missed packets after a user equipment (UE) tunes back to a first network after tuning away from the first network. The UE may determine that a trigger event has occurred, and in response to the determination, modify a negative acknowledgement (NACK) timing configuration from a default configuration. Modifying the NACK timing configuration may include using an aggressive NACK timing configuration for a configurable period of time, in response to detecting a trigger event. The trigger event may include detecting missed packets after a tune back, unavailability of sufficient memory to hold packets until a gap created by missed packets may be filled, or tuning back to a network.

26 Claims, 9 Drawing Sheets

(51) Int. Cl.
*H04L 1/18* (2006.01)
*H04W 36/02* (2009.01)

(52) U.S. Cl.
CPC ....... *H04L 1/1854* (2013.01); *H04W 72/0446* (2013.01); *H04L 1/1835* (2013.01); *H04W 36/02* (2013.01)

(58) Field of Classification Search
CPC ....... H04L 1/18; H04L 1/1678; H04L 1/1854; H04L 1/1848; H04L 5/0055; H04W 72/04; H04B 3/36
See application file for complete search history.

(56) References Cited

U.S. PATENT DOCUMENTS

| | | | | |
|---|---|---|---|---|
| 2005/0216812 | A1* | 9/2005 | Leon | H04L 1/1887 714/748 |
| 2007/0291695 | A1 | 12/2007 | Sammour et al. | |
| 2008/0022178 | A1* | 1/2008 | Kim | H04L 1/1678 714/748 |
| 2008/0219204 | A1* | 9/2008 | Lee | H04L 1/1812 370/315 |
| 2010/0027495 | A1* | 2/2010 | Che | H04L 1/1854 370/329 |
| 2010/0190504 | A1 | 7/2010 | Lee et al. | |
| 2010/0304734 | A1* | 12/2010 | Timner | H04L 1/1829 455/423 |
| 2010/0316096 | A1* | 12/2010 | Adjakple | H04L 1/1887 375/211 |
| 2011/0149919 | A1 | 6/2011 | Kapoor et al. | |
| 2013/0303168 | A1 | 11/2013 | Aminzadeh et al. | |
| 2013/0337861 | A1 | 12/2013 | Bhogaraju et al. | |
| 2014/0277850 | A1* | 9/2014 | Jobs | B63H 19/00 701/2 |
| 2015/0295692 | A1* | 10/2015 | Gowda | H04L 5/0055 370/336 |

FOREIGN PATENT DOCUMENTS

| | | |
|---|---|---|
| EP | 2608605 A1 | 6/2013 |
| WO | 2010129533 A2 | 11/2010 |
| WO | 2011019308 A1 | 2/2011 |
| WO | 2013044982 A1 | 4/2013 |

OTHER PUBLICATIONS

Levasseur B.M., "Impact of Acknowledgments on Application Performance in 4G LTE Networks," May 2014, 134 Pages.

* cited by examiner

METHODS AND APPARATUS FOR SENDING FAST NEGATIVE ACKNOWLEDGEMENTS (NACKS)

CLAIM OF PRIORITY UNDER 35 U.S.C § 119

The present application claims priority to provisional U.S. Application Ser. No. 61/978,538, entitled "METHODS AND APPARATUS FOR SENDING FAST NEGATIVE ACKNOWLEDGEMENTS (NAKS)," filed Apr. 11, 2014, which is assigned to the assignee of the present application and hereby expressly incorporated by reference herein in its entirety.

FIELD

The present disclosure relates generally to wireless communication, and more particularly, to methods and apparatus for speeding the sending of negative acknowledgements (NACKs) when packets are received out of order after a tune-away.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment (UE). The method generally includes determining that a trigger event has occurred. The method may further include modifying a negative acknowledgement (NACK) timing configuration, in response to the determination, and transmitting one or more NACKS in accordance with the modified NACK timing configuration.

Certain aspects of the present disclosure provide an apparatus for wireless communications. The apparatus generally includes means for determining that a trigger event has occurred. The apparatus may further include means for modifying a NACK timing configuration, in response to the determination, and means for transmitting one or more NACKs in accordance with the modified NACK timing configuration.

Certain aspects of the present disclosure provide an apparatus for wireless communications. The apparatus generally includes at least one processor and a memory coupled to the at least one processor. The at least one processor may be configured to determine that a trigger event has occurred. In response to the trigger event, the at least one processor may be configured to modify a NACK timing configuration. The at least one processor may be configured to transmit one or more NACKs in accordance with the modified NACK timing configuration.

Certain aspects of the present disclosure provide a computer-readable medium for wireless communications by a UE. The computer-readable medium may store instructions which when executed by at least one processor may perform a method including determining that a trigger event has occurred. The method may further include modifying a NACK timing configuration, in response to the determination, and transmitting one or more NACKS in accordance with the modified NACK timing configuration.

Aspects generally include methods, apparatus, systems, computer program products, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

DETAILED DESCRIPTION

Figure 1:
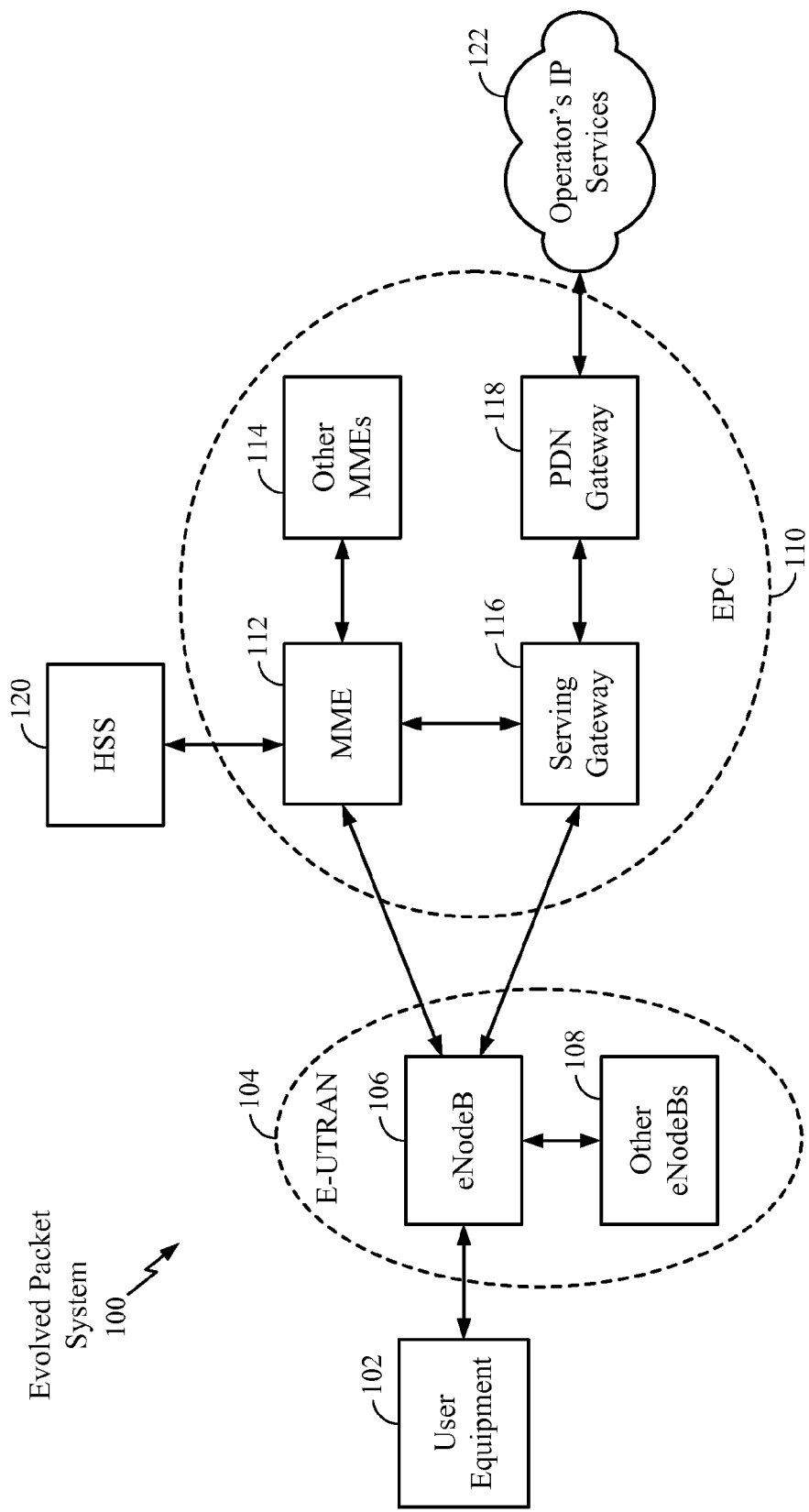
FIG. 1 is a diagram illustrating an example of a network architecture.

A UE may be configured with dual SIM (Subscriber Identity Module) capabilities, having two SIM adapters to hold two SIM cards, each tuned to a different channel/ network. In Dual SIM Dual Standby (DSDS) configuration, both SIM cards may be on standby waiting for call/data connection. However, only one of the SIMs may be actively tuned to a channel/network at one time. The UE may be configured to periodically tune away from the active call to listen to data (e.g., pages) on the other channel/network. The base station is generally blind to this tune away and continues sending packets to the UE. Since the UE is not listening to this base station while tuned away, it may miss packets transmitted by the base station during the tune away. The UE generally determines that the packets were missed based on a packet received out of order, for example, after tune back. The UE generally starts a reordering timer in response to detecting missed packets and sends NACKs for retrieval of the missed packets on expiration of the reordering timer. This may however introduce a significant amount of delay in filling in gaps in data as a result of the tune away.

Aspects of the present disclosure relate to methods and apparatus for sending fast negative acknowledgements (NACKs) after a user equipment (UE) tunes back to a first network after tuning away from the first network. In certain aspects, the UE may determine that a trigger event has occurred, and in response to the determination, modify a NACK timing configuration from a default configuration. Modifying the NACK timing configuration may include using an aggressive NACK timing configuration for a configurable period of time, in response to detecting a trigger event, in order to transmit NACKs faster than expected for quicker recovery of the missed packets. The trigger event may include detecting missed packets after a tune back, unavailability of sufficient memory to hold packets until a gap created by missed packets may be filled, or tuning back to a network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced. For example, UE 102 may be configured with dual SIM capability with one SIM configured for use with a first base station (e.g, eNB 106) and the other SIM configured for use with another eNB (e.g, eNB 108). The UE 102 may be actively tuned to eNB 106 and may periodically tune away to receive data from eNB 108. As noted above eNB 106 may be blind to this tune away and continue to transmit packets to UE 102 during the tune away, and UE 102 may miss the packets since it is not listening eNB 106 during the tune away. UE 102 may determine that it has missed packets transmitted by eNB 106 after tune back to eNB 106, upon receiving a packet out to order.

In certain aspects, UE 102 may modify a NACK timing configuration from a default network configuration to retrieve the missed packets faster, relative to using the default configuration. In an aspect, UE 102 may use an aggressive NACK timing configuration for a configurable period of time, in response to detecting a trigger event, in order to transmit NACKs faster than expected for quicker recovery of the missed packets. The trigger event may include detecting missed packets after a tune back, unavailability of sufficient memory to hold packets until a gap created by missed packets may be filled, or tuning back to a network.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an 51 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

Figure 2:
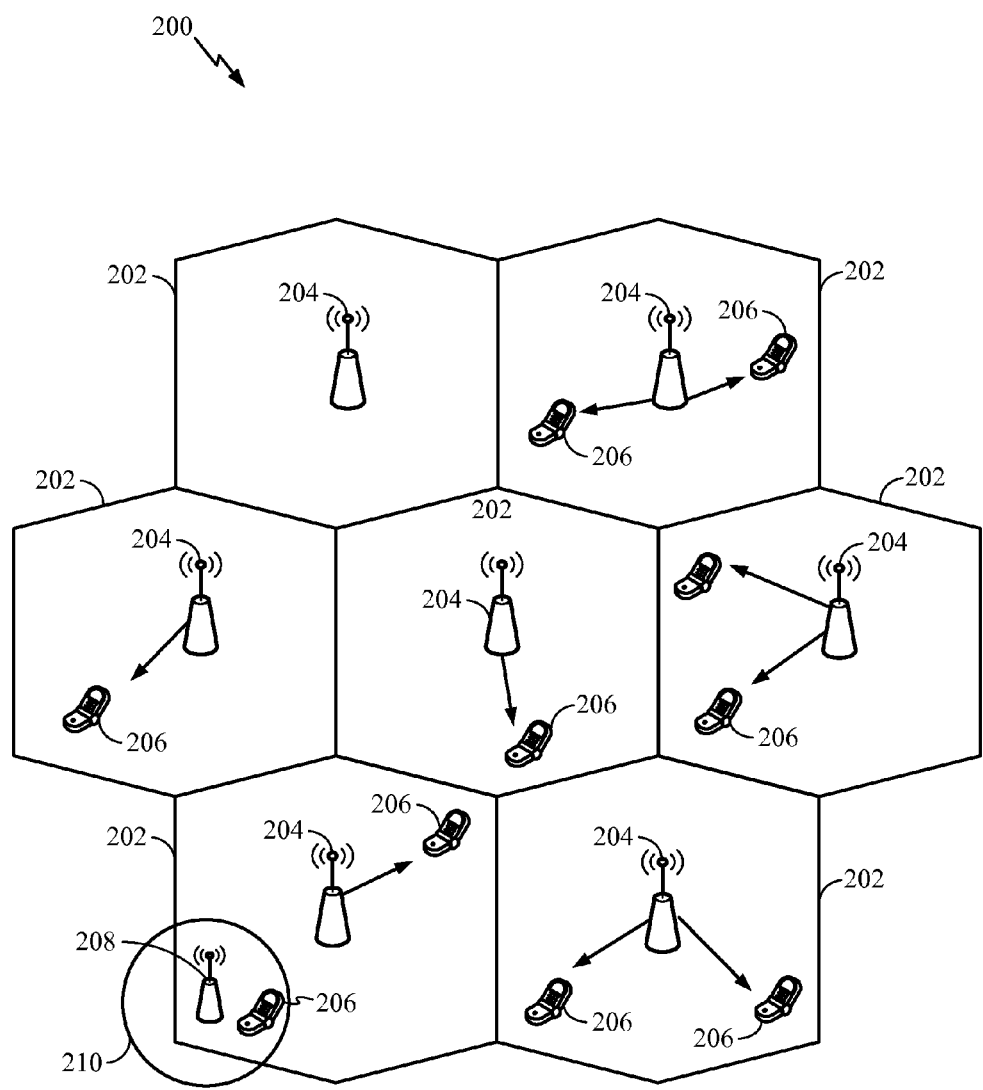
FIG. 2 is a diagram illustrating an example of an access network.

FIG. 2 is a diagram illustrating an example of an access network 200 in an LTE network architecture in which aspects of the present disclosure may be practiced. For example, a UE 206 may be capable of DSDS operation and may implement techniques for fast NACKing of packets missed during a tune away, in accordance with aspects of the present disclosure. In an aspect, UE 206 may modify a NACK timing configuration from a default network configuration to retrieve the missed packets faster than using the default configuration. In an aspect, UE 206 may use an aggressive NACK timing configuration for a configurable period of time, in response to detecting a trigger event, in order to transmit NACKs faster than expected for quicker recovery of the missed packets. The trigger event may include detecting missed packets after a tune back, unavailability of sufficient memory to hold packets until a gap created by missed packets may be filled, or tuning back to a network.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
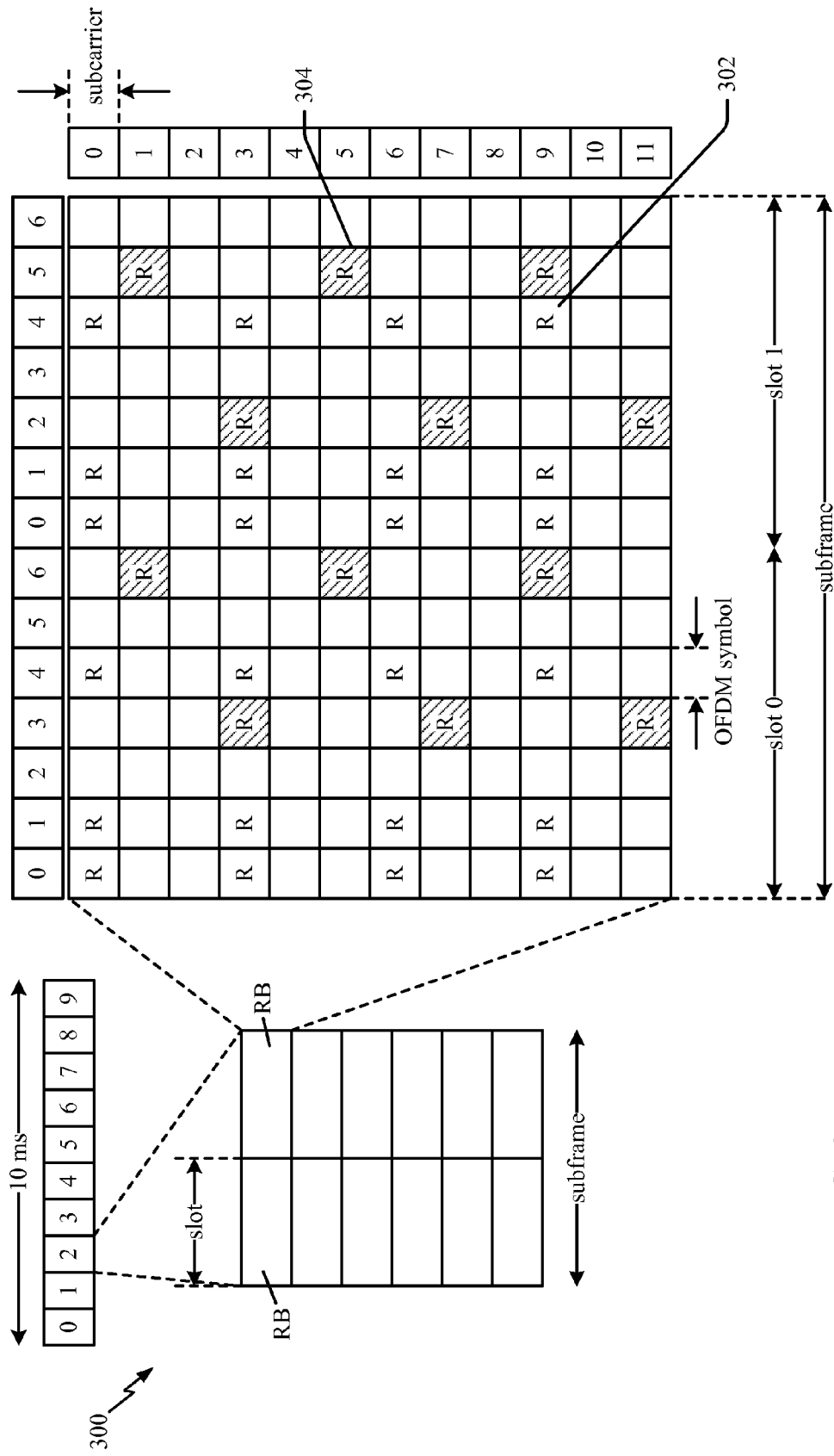
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
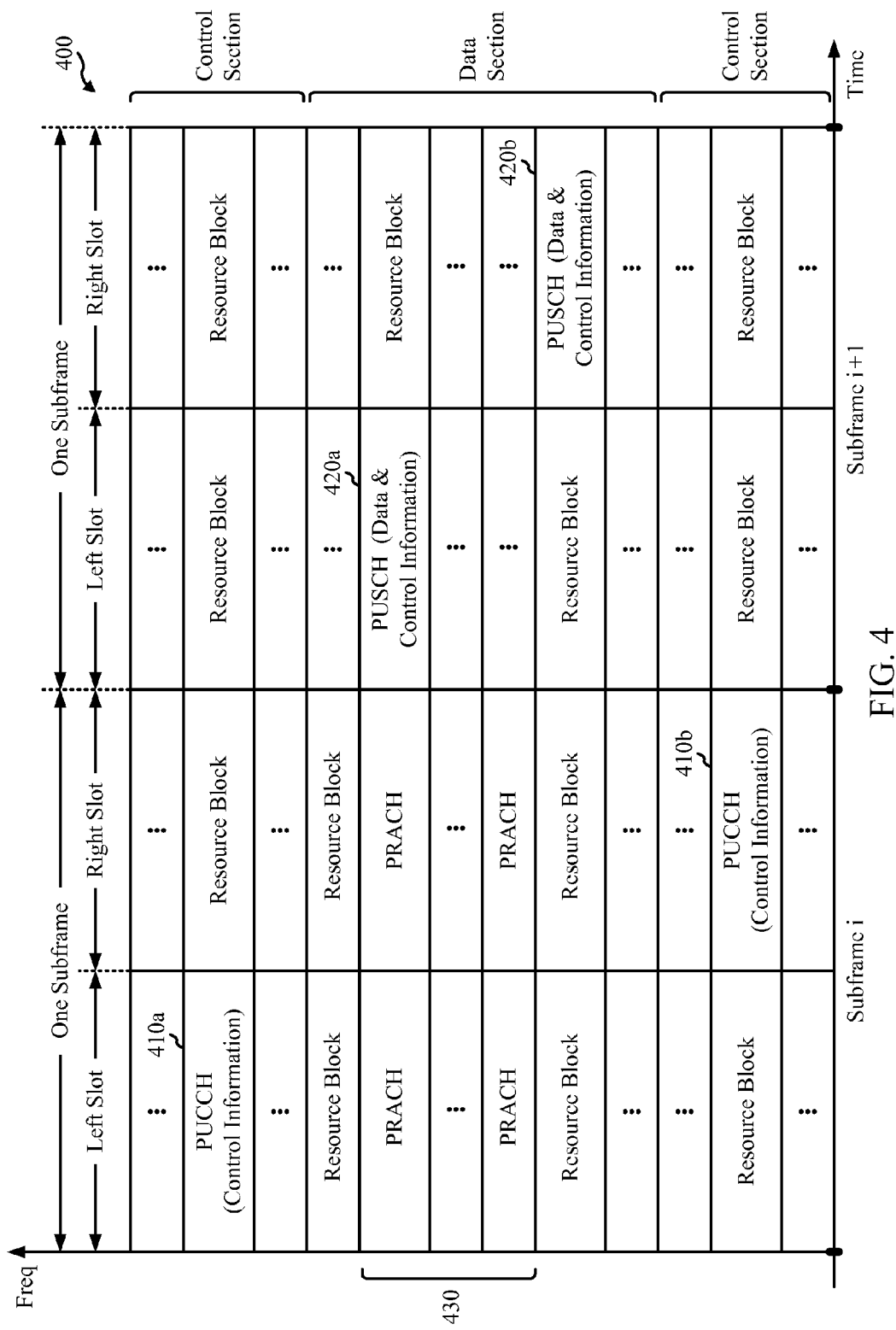
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
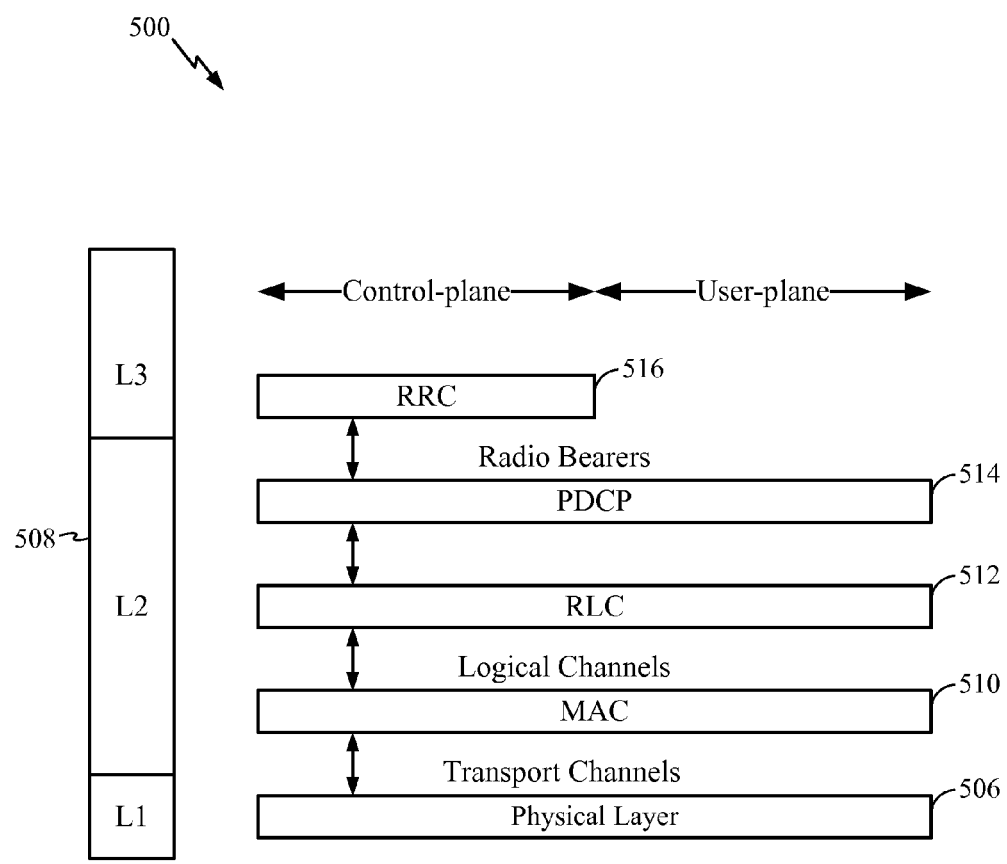
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
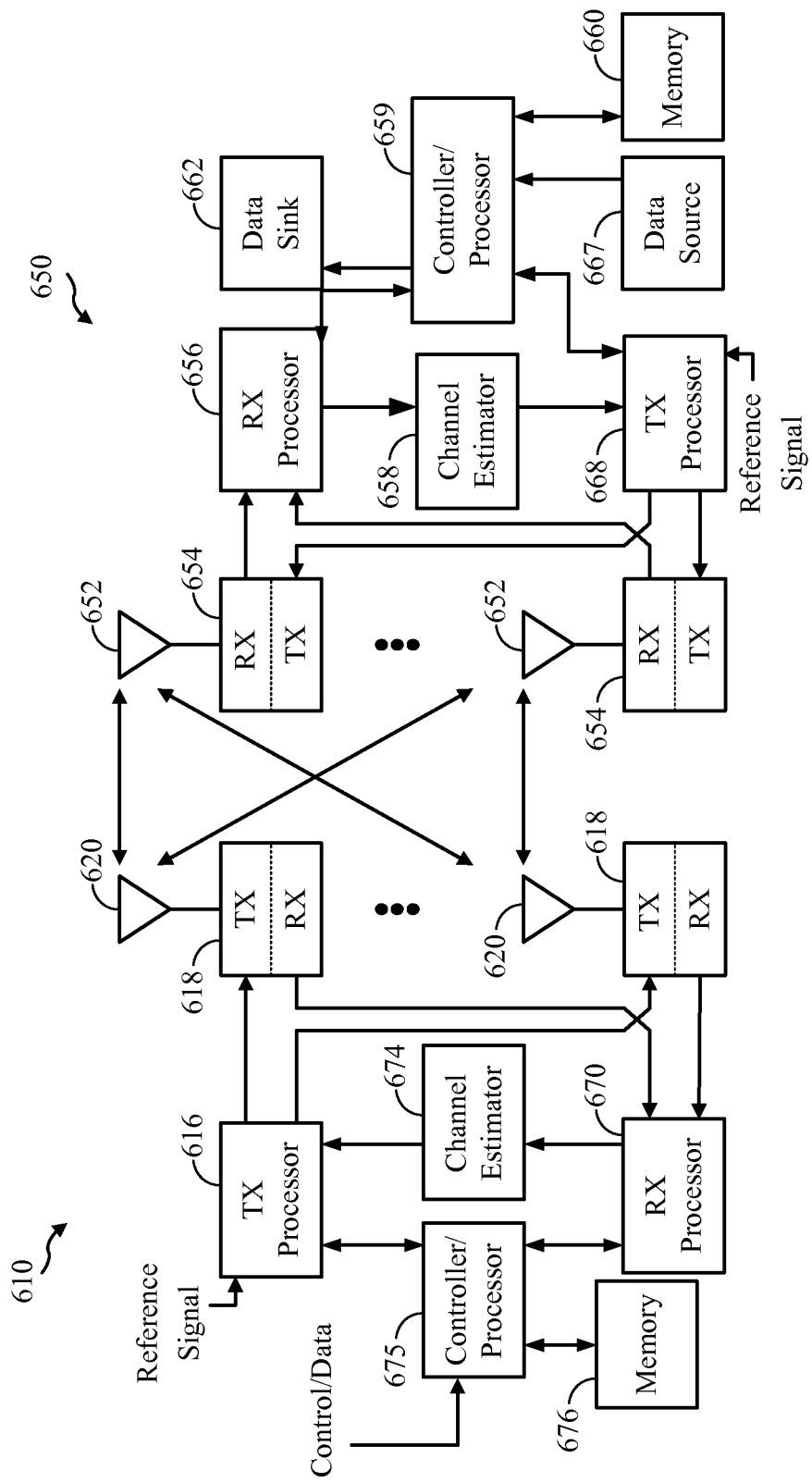
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced. For example, a UE 650 may be capable of DSDS operation and may implement techniques for fast NACKing of packets missed during a tune away, in accordance with aspects of the present disclosure. In an aspect, UE 650 may modify a NACK timing configuration from a default network configuration to retrieve the missed packets faster than using the default configuration. In an aspect, UE 650 may use an aggressive NACK timing configuration for a configurable period of time, in response to detecting a trigger event, in order to transmit NACKs faster than expected for quicker recovery of the missed packets. The trigger event may include detecting missed packets after a tune back, unavailability of sufficient memory to hold packets until a gap created by missed packets may be filled, or tuning back to a network.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively.

Figure 7:
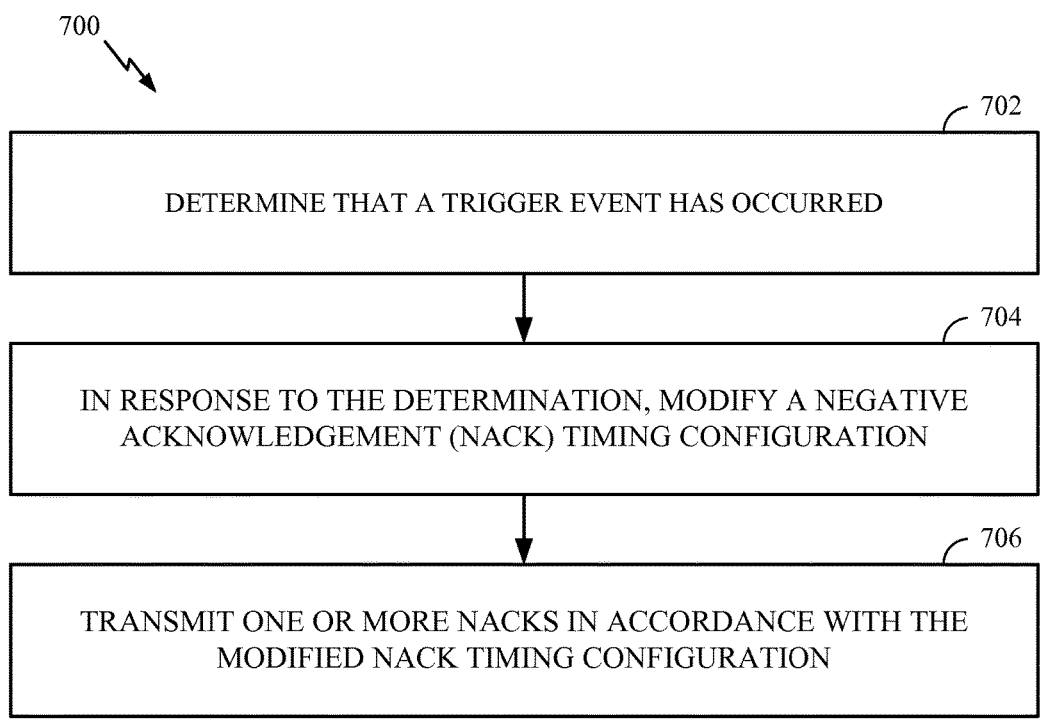
FIG. 7 illustrates example operations performed, for example, by a UE for sending fast NACKs, in accordance with certain aspects of the present disclosure.
Figure 9:
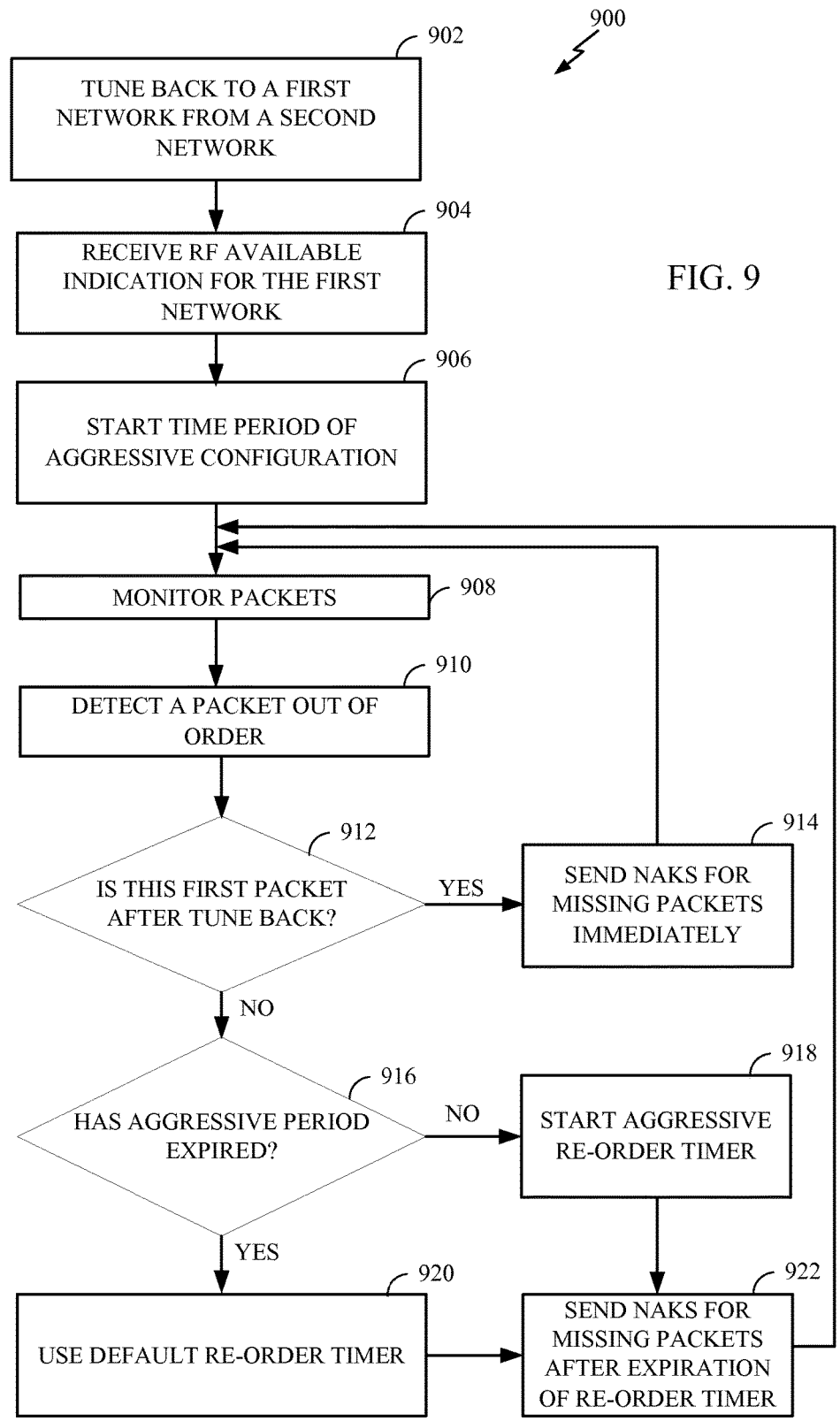
FIG. 9 illustrates example operations performed, for example, by a UE for sending fast NACKs, in accordance with certain aspects of the present disclosure.

The controller/processor 659 and/or other processors and modules at the UE 650 may perform or direct operations for example operations 700 and 900 in FIGS. 7 and 9 respectively, and/or other processes for the techniques described herein. For example, controller/processor 659 may be configured to determine that a trigger event has occurred, and in response to the determination, modify a NACK timing configuration. In such aspects, controller/processor 659 and TX processor 668, may be configured to cause the transmitter 654 to transmit one or more NACKs in accordance with the modified NACK timing configuration. In certain aspects, one or more of any of the components shown in FIG. 6 may be employed to perform example operations 700 and 900 and/or other processes for the techniques described herein. The memories 660 and 676 may store data and program codes for the UE 650 and eNB 610 respectively, accessible and executable by one or more other components of the UE 650 and the eNB 610.

Example Techniques for Sending Fast Negative Acknowledgements (NACKs)

As noted above, a UE may be configured with dual SIM capabilities (dual Subscriber Identity Module). In such an aspect, the UE may include two SIM adapters to hold two SIM cards. Dual SIM operation allows use of two services (or networks) operating on different radio frequency (RF) channels by a single UE. In another aspect, Dual SIM operation may allow for use of two or more radio access technologies (RATs) where access to each RAT may be based on a different SIM card.

In certain aspects, a Dual SIM Dual Standby (DSDS) configured UE allows both SIM cards to be on standby waiting for call/data connection. When a call/data is established on one SIM card, the other is no longer active. In a Dual SIM configuration, both the SIMs time share a receive chain including, for example, at least a set of antennas (e.g., antenna 652) and an RX processor (e.g., RX processor 656, FIG. 6). In an aspect, only one SIM may use the receive chain at one time. Thus, only one of the SIMs may be actively tuned to a channel/network at one time. In certain aspects, according to the 3GPP standards, while a UE having Dual SIM configuration has an active call on one channel (associated to one of the SIMs), the UE periodically tunes away from this active channel to monitor another channel (associated to the other SIM) to check for calls or data. For example, a first SIM of the UE may be configured for use with an LTE network and the second SIM may be configured for use with a 1x network. Both SIMs may share a single receive chain at the UE. The UE, while tuned to the LTE network, may be configured to periodically tune away to listen to pages from the 1x network.

In certain aspects, the dual SIMs at the UE may share two or more receive chains at the UE, each receive chain including its own set of antennas and an RX processor. In an aspect, the two or more receive chains may be configured to be tuned to a single channel/network at one time. For example, the UE may have two separate receive chains, and may be configured to receive packets with odd sequence numbers on a first receive chain and receive packets with even sequence numbers on the second receive chain. In an aspect, the UE may be configured to tune away one of the receive chains (diversity tune away) periodically to listen to pages on a second channel/network.

The eNB is generally blind with respect to such tune away. Thus, the eNB may send packets to the UE on an RF channel while the UE is tuned away from this RF channel. Since the UE is not listening to this channel, these packets may not be received by the UE and may get dropped. When the UE tunes back to its original RF channel and receives a next packet on this channel, one or more packets have been missed during the tune away. In an aspect, the UE determines the packets were missed based on a packet received out of order after tune back.

In certain aspects, according to 3GPP standards, after the UE tunes back to the original RF after a tune away to a different frequency channel, and detects missed packet(s) based on a packet received out of order, the UE starts a default reordering timer. In an aspect, the UE may send NACKs to the eNB for retransmission of the detected missing packets upon expiration of the reordering timer. This may however introduce a significant amount of delay in filling in gaps in data as a result of the tune away.

Certain aspects of the present disclosure discuss techniques by which the UE may modify (e.g., shorten) a NACK timing configuration (e.g., a default configuration), to enable the UE to send NACKs for the missed packet(s) after the tune back, in a manner that is quicker than is available through use of the default reordering timer.

In certain aspects, the UE may use an aggressive NACK timing configuration relative to a default NACK timing configuration (e.g., defined by the network), for a configurable period of time, in response to detecting a trigger condition or event. The trigger event may include detecting missed packets after a tune back, unavailability of sufficient memory to hold packets until a gap created by missed packets may be filled, or tuning back to a network. The UE may revert to a default NACK timing configuration after expiry of the aggressive time period. In an aspect, the aggressive NACK timing configuration may be configured at the UE.

FIG. 7 illustrates example operations 700 performed, for example, by a UE for sending fast NACK s, in accordance with certain aspects of the present disclosure.

Operations 700 begin, at 702, by determining that a trigger event has occurred. At 704, the UE may, in response to the determination of the trigger event, modify (e.g., shorten) a NACK timing configuration. As noted above, the modifying may include using an aggressive NACK timing configuration relative to a default NACK timing configuration for a configurable period of time. At 706, the UE may transmit one or more NACKs in accordance with the modified NACK timing configuration.

In certain aspects, as part of the aggressive NACK timing configuration, instead of or along with starting a reordering timer after receiving a first packet out of order on the downlink (DL) after tune back, the UE may send NACK s for any detected missing packet(s) substantially immediately at the RLC level, after the detection. For example, once the UE tunes back to the original frequency, the UE receives an RF available indication, after which the UE monitors any newly received packets and determines if any packets were missed (e.g. during the tune away).

The UE may determine that a packet is missed if the UE receives a packet out of order. If the UE determines that one or more packets are missing (e.g., there are gaps in data reception), the UE may send NACKs to the eNB after the determination (e.g., without waiting for a reordering timer to expire), for retransmission of the missed packets by the eNB. In certain aspects, if the tune away was relatively small and the UE does not receive any packets out of order, it does not send any NACKs.

In certain aspects, as part of the aggressive NACK timing configuration, the UE may use a more aggressive configuration of the default reordering timer after tune back to an original channel, to account for gaps in reception in this period of time on the channel. For example, the aggressive configuration of the reordering timer may include using a shorter reordering timer (e.g., 10 ms) rather than the reordering time configured by the network (e.g., 40 ms), so that the UE can send NACKs earlier and receive retransmissions relatively quicker.

In certain aspects, the UE may start a configurable timer (e.g., aggressive NACK configuration timer) after receiving the RF available indication to initialize the time period of the aggressive NACK timing configuration and use the aggressive reordering timer until expiration of the aggressive NACK configuration timer. The UE may revert back to the default reordering timer configuration on expiration of this timer. In certain aspects, the UE may initialize the time period of the aggressive NACK timing configuration upon receiving a packet out of order and keep the aggressive configuration until all or most of the missed packets are recovered. In an aspect, the aggressive reordering timer may be configurable at the UE.

The above techniques for quicker recovery of missed packets may be applied to a diversity tune away scenario noted above. For example, if a UE has two receive chains tuned to a channel, and one of the receive chains periodically tunes away to receive data on a second channel, the above discussed aggressive NACK timing configurations may be used to recover packets missed while the receive chain is tuned away. In an aspect, the aggressive NACK timing configuration may be applied upon determining that a packet received after the receive chain tuned back after a tune away, is out of order.

In certain aspects, as noted above, the UE may be configured to receive packets with odd sequence numbers on a first receive chain and receive packets with even sequence numbers on the second receive chain. Thus, when one of the UE receive chains tunes away, the UE knows which packets are missed, for example without receiving a packet out of order. For example, if a receive chain receiving packets with odd sequence numbers is tuned away, then all gaps in order of packets will be in the positions of odd numbered packets during the tune away. Thus, in certain aspects, since the gaps are deterministic, i.e., the UE knows which packets will be missed during the tune away, the UE may be able to trigger NACKS faster than normal to fill the gaps. For example, the UE may start sending NACKS for the missed packets as soon as a receive chain tunes back to an original channel. In certain aspects, while the above example discusses the first and the second receive chains configured to receive packets with odd and even sequence numbers respectively, it may be noted that the receive chains at a UE may be configured to receive packets in any order. For example, the UE may be configured to switch receive chains after receiving five packets continuously on one receive chain. Further, the UE may be configured with more than two receive chains, where the order in which a receive chain receives packets is pre-configured.

In certain aspects, whenever the UE detects a gap in the order of packets (e.g., due to missed packets), it holds all received packets in its memory to the highest sequence number received until the gap is filled. In an aspect, the UE may not have sufficient memory to store all the packets until the gap is filled. In such cases a flow control triggering mechanism may trigger the aggressive NACK timing configuration to fill the gaps faster in order to free the memory. For example, upon detecting insufficient memory (e.g., below a configurable threshold), the UE may start sending NACKs without waiting for the reordering timer to expire. Additionally or alternatively, the UE may use a shorter reordering timer until the memory is freed, for example, above the configurable threshold.

Figure 8:
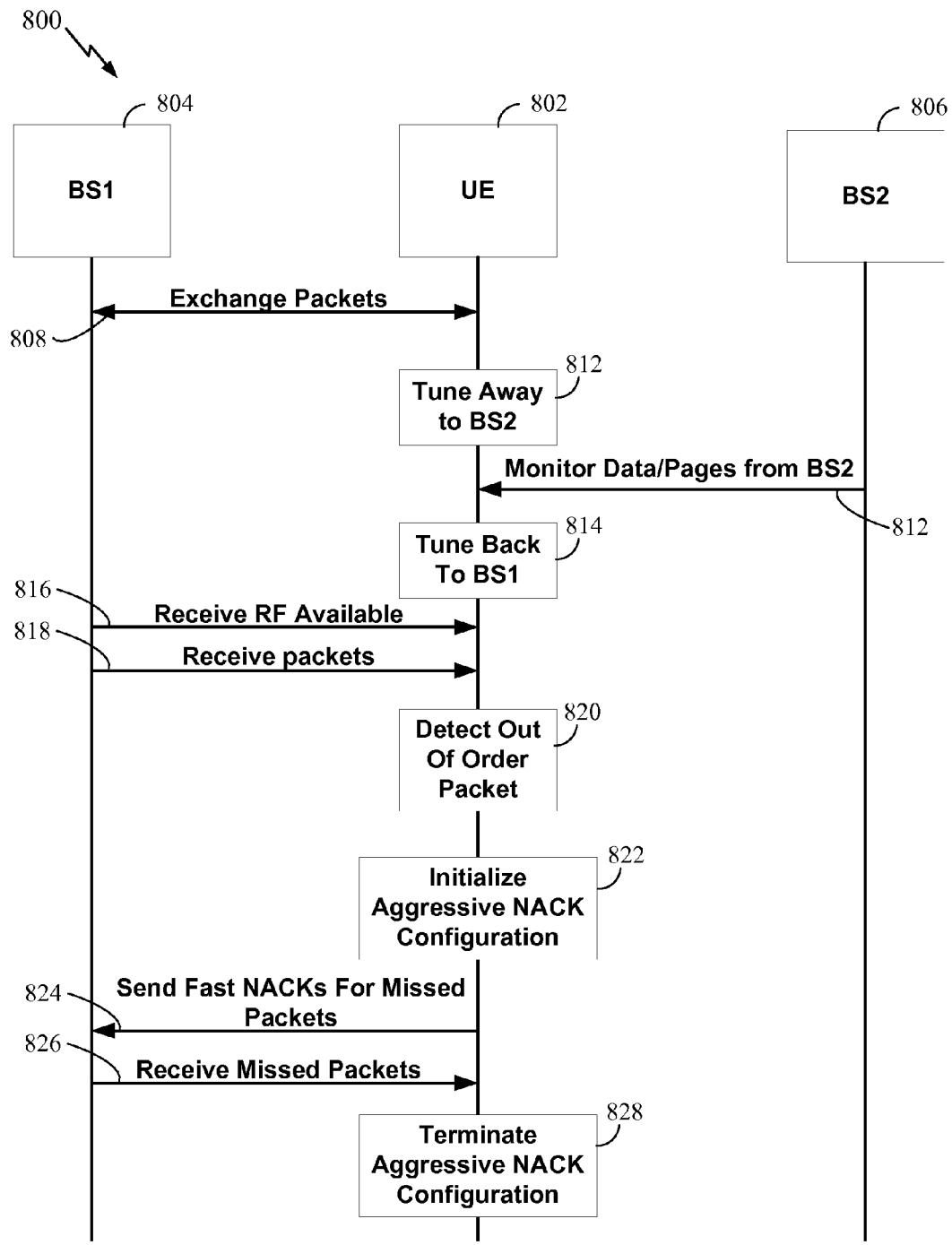
FIG. 8 illustrates an example call flow for fast NACKing of missed packets, in accordance with certain aspects of the present disclosure.

FIG. 8 illustrates an example call flow for fast NACKing of missed packets by a UE 802, in accordance with certain aspects of the present disclosure.

In some cases, the UE 802 may be capable of dual SIM operation and may be configured to communicate on two separate channels/networks. For example, the UE 802 may be configured to receive packets of data from base station (BS1) 804 and BS2 806 on different channels. In an aspect, BS1 804 and BS2 806 may utilize different radio access technologies (RATs) to serve the UE 802. Further, UE 802 may have a set of receive chains including two or more receive chains, the receive chains in the set being tuned to one of the BS1 804 and BS2 806 at one time.

As shown in FIG. 8, at 808, UE 802 is tuned to BS1 804 and receiving packets of data on the downlink from BS1 804. As noted above, UE 802 may be configured to periodically tune away (e.g., one or more receive chains) from BS1 804, at 812, to receive data (e.g., pages) from BS2 806. After listening to pages from BS2 806, UE 802 tunes back the one or more receive chains to BS1 804, at 814, after a configured time period (e.g., configured by the network or at the UE). At 816, UE 802 receives RF available indication from BS1 804 and, at 818, starts receiving packets from BS 804.

At 820, UE 802 receives a packet out of order indicating a gap in the order of packets received from BS1 804 as a result of the tune away. In response to receiving the out of order packet, UE 802 initializes a time period of aggressive NACK timing configuration at 822.

As noted above, as part of the aggressive NACK configuration, UE 802 may send NACKs for the missed packets substantially immediately after receiving the packet out of order or use a shorter reordering timer to trigger faster NACKs relative to a default reordering timer. As shown in FIG. 8, UE 802 sends fast NACKs for missed packets at 824 based on the aggressive NACK configuration, and receives the missed packets from BS1 804 at 826. At 828, UE 802 terminates the aggressive NACK configuration after a configurable period of time and reverts to a network configured NACK timing configuration.

In certain aspects, the aggressive NACK configuration may be triggered by a determination by UE 802 of insufficient memory (e.g., below a threshold). For example, upon detecting a packet out of order, UE 802 may continue to use a default NACK configuration until it determines that the memory at the UE 802 is below a threshold, at which point the UE may trigger the aggressive NACK configuration to recover the missed packets quickly to free the memory.

Thus, the above discussed techniques enable missing packets to be NACKed comparatively earlier resulting in comparatively faster retransmission of the missing packets by the eNB, thereby filling the gaps in reception comparatively quicker and increasing throughput.

In certain aspects, the UE may use a combination of approaches discussed above. For example, after getting the RF available indication, the UE may substantially immediately send NACKs (e.g., without waiting for the reordering timer) for missed packet(s) detected based on receiving a first or a first few packets out of order after tune back, and in addition run the aggressive NACK timing configuration including shorter reordering timers for a configurable period of time after tune back to account for any further gaps detected during this period.

In certain aspects, sending NACKs substantially immediately for gaps detected based on the first or the first few packets may create a BLER (Block Error Rate) because of which the UE may miss some more packets in the future. Keeping the aggressive configuration for a period of time after the RF available indication helps recover these missed packets.

FIG. 9 illustrates example operations 900 performed, for example, by a UE (e.g, UE 650, UE 102, UE 206, etc.) for sending fast NACKs, in accordance with certain aspects of the present disclosure.

Operations 900 begin, at 902, by the UE tuning back to a first network from a second network, for example after having been tuned away from the first network to the second network. At 904, the UE receives an RF available indication for the first network after the tuning back.

At 906, the UE may start a time period of aggressive NACK configuration, for example by starting a timer, after receiving the RF available indication for the first network on tuning back. At, 908, the UE may monitor received packets and attempt to detect if it has missed any packets.

At 910 the UE may receive an out of order packet indicating that the UE has missed one or more packets, for example, due to the tune away. At 912, if the out of order packet received at 910 is a first packet after the tuning back, operations proceed to 914 where the UE immediately sends NACKs for one or more missing packets, for example without starting a reordering timer.

At 912, if the detected out of order packet is not the first packet after tune back, operations proceed to 916, where the UE may check if the time period of aggressive NACK configuration has expired. In an aspect, the UE may determine whether the time period has expired by checking if the timer that was started at 906 has expired.

If the aggressive period has not expired, the operations proceed to 918, where the UE may start performing NACKs in accordance with an aggressive reordering timer (for the remaining duration of the period of aggressive configuration). As noted above, the value of the aggressive reordering timer may be less than a default value defined by the network. At 922, the UE may send NACKs for one or more missing packets on expiration of the aggressive reordering timer.

At 916, if the aggressive period has expired, the UE may send NACKs after expiration of the default timer at 922. As noted above, the UE may terminate the aggressive NACK time period on expiration of the timer started at 906.

It may be noted that the techniques for fast NACKing discussed above for recovering missed packets are not limited to tune away and tune back scenarios only. These techniques may be applied to any situation when missed packets are detected and need to be quickly recovered to fill one or more gaps in an order of received packets.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
   determining that a trigger event has occurred;
   in response to the determination, modifying a negative acknowledgement (NACK) timing configuration by initializing a time period of an aggressive NACK timing configuration, wherein during the time period, NACKs for one or more missed packets are transmitted quicker relative to a default NACK timing configuration; and
   transmitting one or more NACKs in accordance with the modified NACK timing configuration.

2. The method of claim 1, further comprising determining that a packet is received out of order indicating one or more missed packets, wherein determining the trigger event comprises determining that memory available to store packets received out of order has fallen below a threshold value.

3. The method of claim 2, wherein the threshold value is configurable at the UE.

4. The method of claim 1, further comprising:
   tuning back to a first network after tuning away from the first network, wherein determining the trigger event comprises determining that a packet received after tuning back to the first network is received out of order.

5. The method of claim 1, wherein the trigger event comprises tuning back to a first network after tuning away from the first network.

6. The method of claim 1, further comprising tuning back a first receive chain to a first network after tuning away from the first network, the first receive chain being one of at least two receive chains configured for the first network,
   wherein determining the trigger event comprises at least one of determining that the first receive chain tuned back to the first network or determining that a packet received after the tuning back is received out of order.

7. The method of claim 1, further comprising using a reordering timer with a value that is less than a default value of the reordering timer, during the time period of the aggressive NACK timing configuration.

8. The method of claim 1, further comprising sending one or more NACKs for one or more missed packets without waiting for a reordering timer to expire, during the time period of the aggressive NACK timing configuration.

9. The method of claim 1, further comprising during the time period of the aggressive NACK timing configuration:
   sending NACKs for one or more missed packets without waiting for a reordering timer to expire if a packet received out of order is the first packet received after tune back to a network; and
   initializing a reordering timer with a value that is less than a default value of the reordering timer, if the packet received out of order is not the first packet received after tune back to the network.

10. The method of claim 1, wherein the time period is configurable at the UE.

11. The method of claim 1, wherein a value of a reordering timer used during the time period is configurable at the UE.

12. The method of claim 1, further comprising reverting to a default NACK timing configuration after expiration of the time period.

13. An apparatus for wireless communication, comprising:
    means for determining that a trigger event has occurred;
    means for modifying a negative acknowledgement (NACK) timing configuration by initializing a time period of an aggressive NACK timing configuration, wherein during the time period, NACKs for one or more missed packets are transmitted quicker relative to a default NACK timing configuration; and
    means for transmitting one or more NACKs in accordance with the modified NACK timing configuration.

14. The apparatus of claim 13, further comprising means for determining that a packet is received out of order indicating one or more missed packets, wherein the trigger event comprises determining that memory available to store packets received out of order has fallen below a threshold value.

15. The apparatus of claim 14, wherein the threshold value is configurable at the apparatus.

16. The apparatus of claim 13, further comprising:
    means for tuning back to a first network after tuning away from the first network, wherein the trigger event comprises determining that a packet received after tuning back to the first network is received out of order.

17. The apparatus of claim 13, wherein the trigger event comprises tuning back to a first network after tuning away from the first network.

18. The apparatus of claim 13, further comprising means for tuning back a first receive chain to a first network after tuning away from the first network, the first receive chain being one of at least two receive chains configured for the first network,
    wherein the trigger event comprises at least one of determining that the first receive chain tuned back to the first network or determining that a packet received after the tuning back is received out of order.

19. The apparatus of claim 13, further comprising means for using a reordering timer with a value that is less than a default value of the reordering timer, during the time period of the aggressive NACK timing configuration.

20. The apparatus of claim 13, further comprising means for sending one or more NACKs for one or more missed packets without waiting for a reordering timer to expire, during the time period of the aggressive NACK timing configuration.

21. The apparatus of claim 13, further comprising means for, during the time period of the aggressive NACK timing configuration,
    sending NACKs for one or more missed packets without waiting for a reordering timer to expire if a packet received out of order is the first packet received after tune back to a network; and
    initializing a reordering timer with a value that is less than a default value of the reordering timer, if the packet received out of order is not the first packet received after tune back to the network.

22. The apparatus of claim 13, wherein the time period is configurable at the apparatus.

23. The apparatus of claim 13, wherein a value of a reordering timer used during the time period is configurable at the apparatus.

24. The apparatus of claim 13, further comprising means for reverting to a default NACK timing configuration after expiration of the time period.

25. An apparatus for wireless communication, comprising:
- at least one processor configured to:
  - determine that a trigger event has occurred;
  - in response to the determination, modify a negative acknowledgement (NACK) timing configuration by initializing a time period of an aggressive NACK timing configuration, wherein during the time period, NACKs for one or more missed packets are transmitted quicker relative to a default NACK timing configuration; and
  - transmit one or more NACKs in accordance with the modified NACK timing configuration; and
- a memory coupled to the at least one processor.

26. A non-transitory computer-readable medium for wireless communication by a user equipment (UE), storing instructions which when executed by at least one processor performs a method comprising:
- determining that a trigger event has occurred;
- in response to the determination, modifying a negative acknowledgement (NACK) timing configuration by initializing a time period of an aggressive NACK timing configuration, wherein during the time period, NACKs for one or more missed packets are transmitted quicker relative to a default NACK timing configuration; and
- transmitting one or more NACKs in accordance with the modified NACK timing configuration.

* * * * *